United States Patent [19]

Garfinkle

[11] 4,274,011
[45] Jun. 16, 1981

[54] WIND TURBINE FOR MARINE PROPULSION

[76] Inventor: Marvin Garfinkle, 943 E. McPherson St., Philadelphia, Pa. 19150

[21] Appl. No.: 130,512

[22] Filed: Mar. 14, 1980

[51] Int. Cl.³ .................. B63H 13/00; F03D 9/00
[52] U.S. Cl. .................. 290/55; 416/132 B; 416/142; 416/196 A; 416/240; 440/8
[58] Field of Search .................. 290/43, 44, 54, 55; 60/398; 416/132 B, 142 B, 196 A, 240 A, DIG. 426; 114/39, 102–113; 115/1 C, 3, 900; 440/8

[56] References Cited

U.S. PATENT DOCUMENTS

| | | | |
|---|---|---|---|
| 227,842 | 5/1880 | Rudolph | 416/132 B |
| 556,396 | 3/1896 | Auld | 416/142 B |
| 802,144 | 10/1905 | Harrington | 416/DIG. 4 |
| 1,181,988 | 5/1916 | Breitung | 290/44 |
| 1,804,493 | 5/1931 | Benjamins | 416/240 A |
| 1,849,731 | 3/1932 | Nakatani | 115/3 |
| 2,677,344 | 5/1954 | Annis | 416/132 B |
| 4,061,105 | 12/1977 | Garcia | 115/3 |
| 4,130,292 | 12/1978 | Lorenz | 114/39 |

FOREIGN PATENT DOCUMENTS 2423250 11/1975 Fed. Rep. of Germany ............ 114/39

*Primary Examiner*—Stanley J. Witkowski
*Assistant Examiner*—Shelley Wade

[57] ABSTRACT

A wind turbine on an essentially vertical mast converting wind power to electric power for the propulsion motors of a screw propelled ship. The turbine is omnidirectional and capable of being reefed for speed control.

5 Claims, 8 Drawing Figures

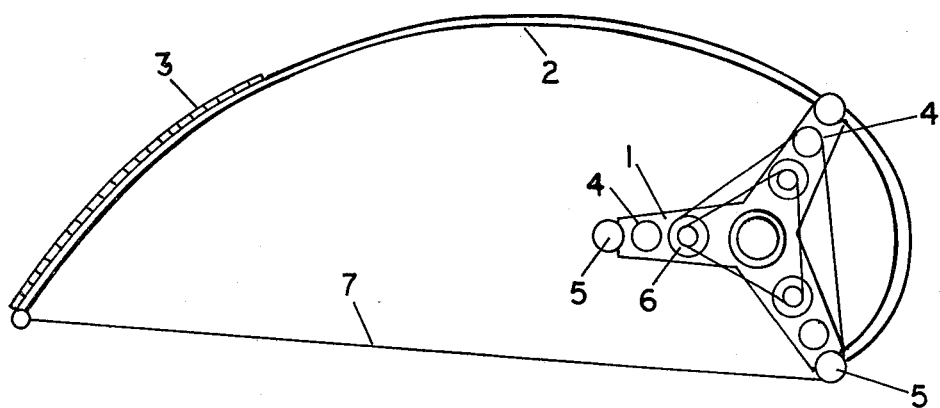
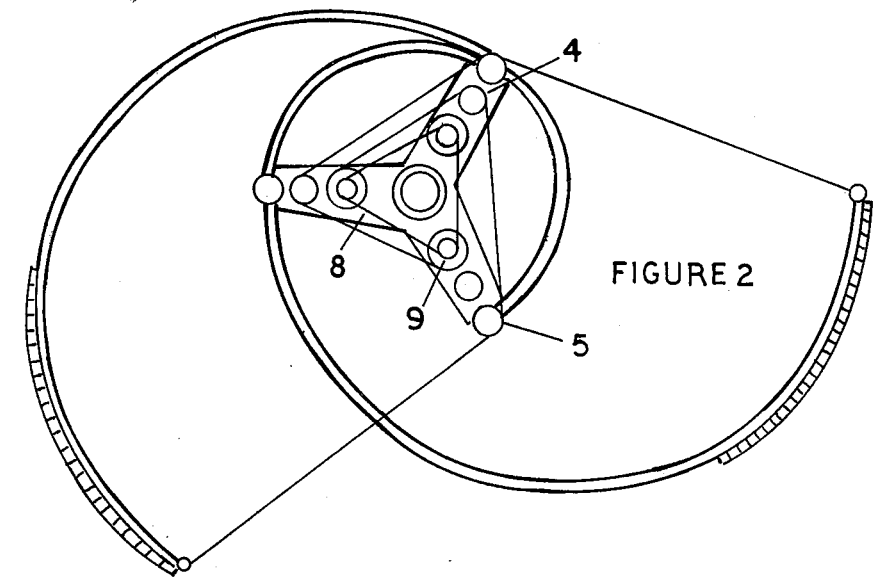
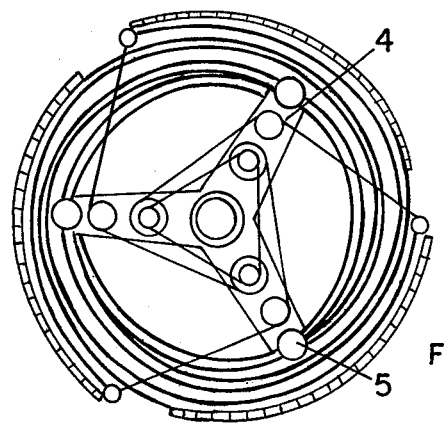
FIGURE 1
FIGURE 2
FIGURE 3

WIND TURBINE FOR MARINE PROPULSION

The age of commercial sail did not come to some abrupt end with the introduction of steam, as many mistakenly imagine, but lingered on well into the twentieth century; finally ending with the dawn of World War II. In fact steam prolonged the age of sail, for it powered the capstan to raise and lower the massive sails and weigh the anchor, as well as provide power steering for the great leviathans that brought the age to a close: the supernovas that signal the death of a star.

It would be equally mistaken to assume that steam succeeded sail because mechanical propulsion was more reliable than sail propulsion, for if any condition characterizes the sea, it is the almost unrelenting presence of the wind: power free for the asking, power without combustion or the need for fuel. Moreover, there surely was no gain in cargo space with the elimination of sailmaking and sail storage facilities because fuel storage more than filled these spaces when steam replaced sail. Consequently, in light of these disadvantages of steam, which must include the complexity of mechanical propulsion compared to sail, obviously to replace sail with steam meant that sail suffered a debility so great that it overshadowed these disadvantages of steam. Though it might appear that this debility was the lack of speed, in fact it was the lack of certainty.

In this context, certainty denotes a commercial concept, not a navigational concept. Modern business practices depend on scheduling, particularly scheduling as related to transport. Far more important than the transit time required to move goods from their origin to their destination is the certainty that they arrive at the time specified. Speed is simply a quantity purchased, with the greater the desired speed the greater the required cost. In contrast, certainty is not a commercial quantity, with the greater price commanded for the greater certainty of arriving on schedule; or arriving at all. Without certainty in transport, all business scheduling suffers; which is not the case as far as speed in itself is concerned.

The single great advantage of mechanical propulsion, whether in surface, water, or air transport, is that it introduced the element of certainty in scheduling. Commercial sail could not provide this element, which finally doomed it. Speed was not the primary factor, for the clipper ships—essentially oversized seagoing yachts—could average thirteen knots over considerable distances, and under the most favorable conditions could reach speeds on the order of twenty knots over short periods; faster than most of today's freighters. Unfortunately, it was how favorable these conditions were that was the primary factor that determined the speed of sailing ships: the wind speed and direction; a factor of secondary importance to mechanically-propelled ships. Because this factor was outside their control, the transit time of sailing ships could not be specified with any degree of certainty, neither by the ship's operator before the voyage began, nor by the ship's master while the voyage was underway. Because of this uncertainty, the ship itself could not be scheduled on any regular basis except for a single voyage at a time, so that to understand the reason for this uncertainty is to understand the reason sail was doomed for commercial ship propulsion.

Consider a sailing ship proceeding thru a uniformly moving mass of air: a constant wind. The speed the ship can attain depends on many factors, such as hull shape, length, and displacement; and of primary importance, the size of its propulsion unit: the total sail area actually acted upon by the wind; and the reaction of the sails to the wind. The latter depends on the ship's heading relative to the wind direction. No sailing ship can proceed directly to windward: directly into the wind; and sails are least efficient on a run: sailing to leeward, sailing directly with the wind. Hence, as a ship's heading approaches a point parallel to the wind, the efficiency of sail as a propulsion means diminishes. As a ship's heading changes from such a parallel course towards a beam reach: a direct crosswind, the propulsive efficiency of sail increases, and reaches a maximum on a broad reach, with the wind abaft the beam; the fastest point of sail. Consequently, if the desired heading lies nearly parallel to the wind, a tacking course is required, which significantly lengthens the transit distance, and adds the element of uncertainty to the transit time. If a strong headwind is encountered, the required course might be so much longer than the most direct route that all certainty is lost.

It is because the speed of a sailing ship is so dependent on wind direction that gives rise to this uncertainty in transit time, for any heading lying within the quadrants directly to windward and to leeward cannot be sailed if the best transit time is to be realized. That is, roughly half the possible azimuth points are not sailed; are essentially off-limits to sail-propulsion for commercial transport. This limitation simply highlights the limits to maneuverability of sailing ships in general: poor to begin with and progressively worse with increasing displacement. Their inability to rapidly change course or speed to avoid an obstacle or collision in any time span acceptable to mechanized marine-transport would make any proposed heavy commercial sailing-ship a positive hazard to navigation when mixed with engine-propelled ships in busy seaways and port areas, particularly when a tacking course is required.

In contrast, if such ships sail courses well away from direct routes to take advantage of favorable winds, their greatly lengthened course and increasingly uncertain transit time will adversely affect their commercial viability. Moreover, any course chosen will require that they stay well clear of lee shores to avoid running aground under storm conditions.

To remedy this problem of poor maneuverability, proponents of commercial sail propose to equip such ships with engines, not simply to propel them thru calm seas, but for maneuverability in congested areas and to avoid lee shores under storm conditions. For this purpose, the engines would have to have perhaps 75 percent of the power of a motorship of the same displacement. Because propulsion equipment accounts for about 25 percent of the construction cost of a ship however, to use such equipment intermittently would be extremely wasteful as its cost could never be returned. In contrast, to use the engine to its fullest potential would render a engine-augmented sailing ship no more than a sail-augmented motorship. For the latter there is little economic attractiveness, because the marginal fuel-saving could never justify the design compromises and expense of wind propulsion.

Despite all these problems, sail still has two factors going for it that override all its disadvantages: the rising cost of fuel and its diminishing availability. Fuel costs account for about 25 percent of a freighter's operating expenses; and marine fuel requirements account for more than five percent of the world's fuel consumption. Nevertheless, the certainty problem remains because wind conditions are the ultimate arbiters and the source of uncertainty of transit time under sail, so that this means of wind propulsion will always suffer from this debility; and it is of such a magnitude so as to render sail-propelled ships unsuitable for modern commercial transport in direct competition with motorships. While this debility must be suffered as intrinsic to wind-propulsion, the invention described herein relates to a wind-propulsion system that can reduce this uncertainty to such a low level that it can be accommodated by modern scheduling practices.

According to this invention, a commercial transport would be powered by wind turbines of an original and unique design geared to electric generators. The output of the generators, after suitable conditioning for control and efficiency, would be fed to propulsion motors turning conventional screws. For marine service, such wind turbines must be sufficiently rugged not only to withstand gale-force winds, but to extract power from them. They must be omnidirectional so as to be independent of wind direction, and capable of being reefed for speed control. No wind turbines now in operation or being developed for land-based power-generation meets these minimal requirements for marine service.

BRIEF DESCRIPTION OF THE DRAWINGS

FIG. 1 illustrates a horizontal section through a rotorsail turbine.

FIG. 2 illustrates two of the turbine's three sails partially reefed.

FIG. 3 illustrates the turbine with its rotorsails fully furled.

To meet these requirements, a vertical-shaft rotorsail-turbine has been devised. FIG. 1 illustrates a horizontal section thru a rotorsail turbine with only one of its three yards upon which sails are secured shown for simplicity. The yard is shown fully extended. Attached to the ends of the arms of the hub (1) are flexible yards (2) that secure the sails (3). Arranged on each of the arms of the hub are two sheaves (4) and (5) and a windlass (6). As shown, the windlass controls the free length of cable (7), which in turn controls the rotorsail extension. From the windlass the cable passes over the inner sheave (4) and then over the outer sheave (5) before securing the rotorsail. The cable carries the wind force to the arm of the hub where it constitutes the driving torque of the rotorsail turbine.

FIG. 2 illustrates two of the turbine's three sails partially reefed. Because the extension of the sails must be identical under all circumstances, the windlasses are synchronized by the chain drive (8) which passes over sprockets (9) secured to each windlass. It is evident that the turbine can generate power at any degree of sail extension because the basic rotorsail configuration is maintained to full furl.

FIG. 3 illustrates the turbine with its rotorsails fully furled. The aerodynamic drag of the turbine with its sails fully furled will be considerably less than that of the turbine and support structure of other wind-turbine designs when inoperative.

FIGS. 4 and 5 illustrate a rotor hub and its running rigging in detail. Hubs are mounted on bearings (10) at equidistant stations along the stationary mast (11) that permit the hubs to rotate freely about the mast. Power is transmitted from the uppermost hub thru the intermediate hubs to the generator below by means of the torque tubes (12) situated between the hubs and secured to them. The connection is thru conventional gear couplings (13) so as to accommodate normal mast bending. The hubs are so arranged that their arms are alligned. This allignment permits the single drive shaft (14) to control all of the windlasses to which it is connected.

As shown in FIG. 5, each hub station accommodates two sets of yards sufficiently spaced apart to permit the running rigging to operate in the slot between them. Because in certain ranges of sail extension the cable (7) does not contact the sheave (5)—as is evident by comparing FIGS. 2 and 3—this sheave is purposefully wider than the slot to accommodate any misallignment in the cable (7).

FIG. 6 illustrates the rotorsail turbine in elevation with the mast (11) secured as it might be in practice. The sail cloth (3) is stretched between the yards (2). So that the sails maintain the same curvature as the yards, they are stretched across the outside of the battens (15) which are fastened at intervals along the rigid stays (16) and (17) that are secured to the yards. The two sets of yards at each hub station are connected only at the yardarms to the rigid brace (18) which runs the length of the rotor and maintains all the yards to which it is secured at the same curvature. It is the action of the cable (7) on the brace (18) that controls the extension of the rotorsails. The windlasses (6) that control the free length of the cable (7) are powered by the motor-driven worm-gear reducer (19).

Figure 4:
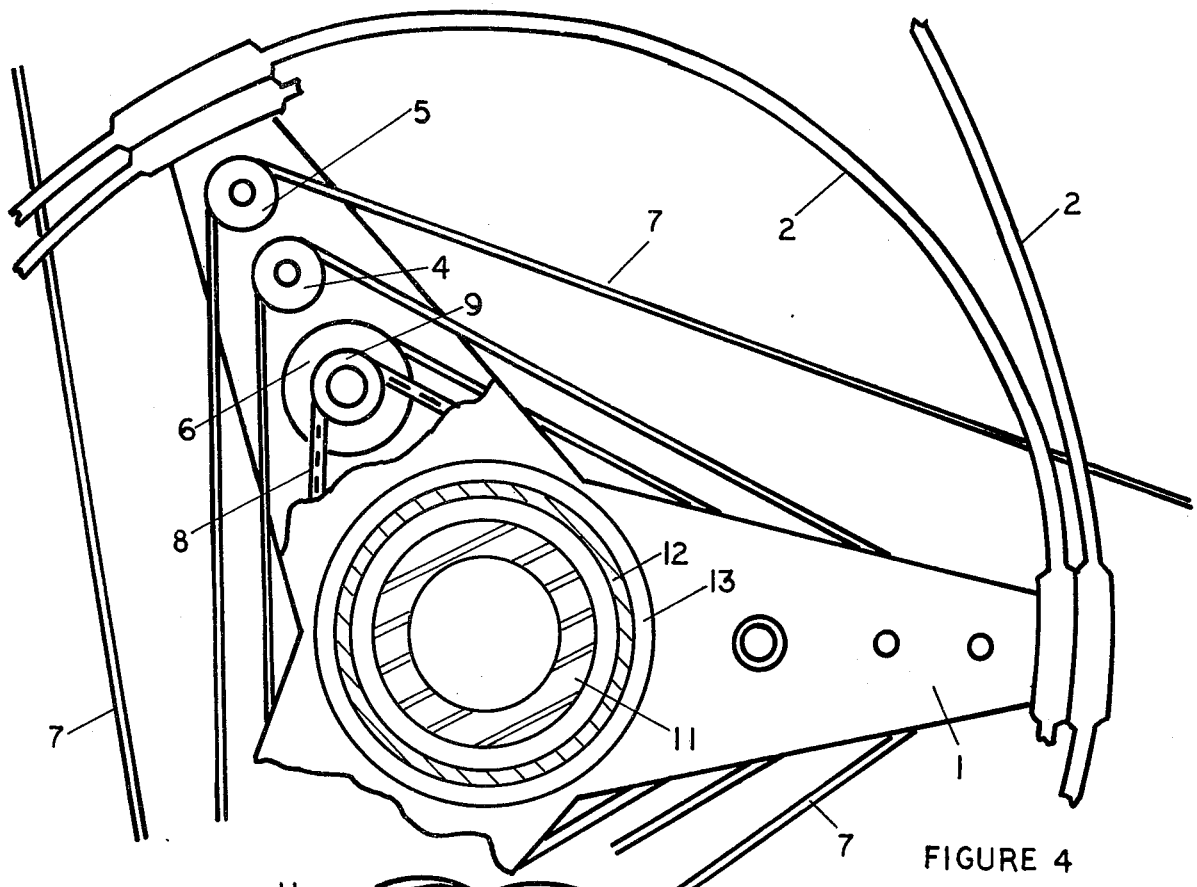
FIGS. 4 and 5 illustrate a rotor hub and its running rigging in detail.
Figure 5:
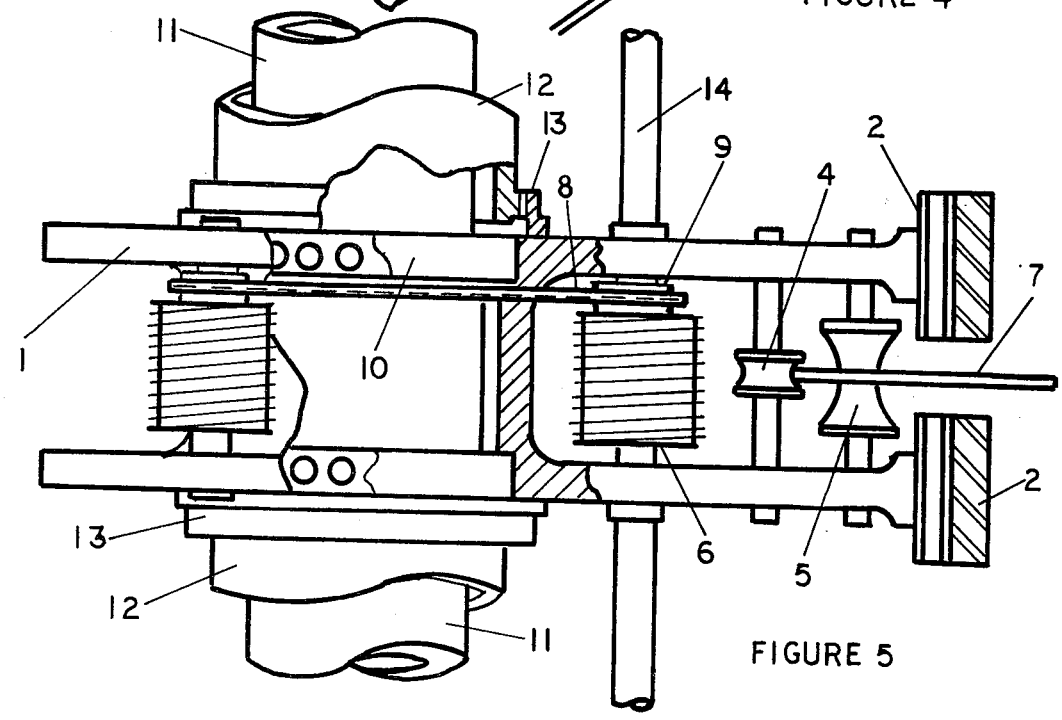
Figure 6:
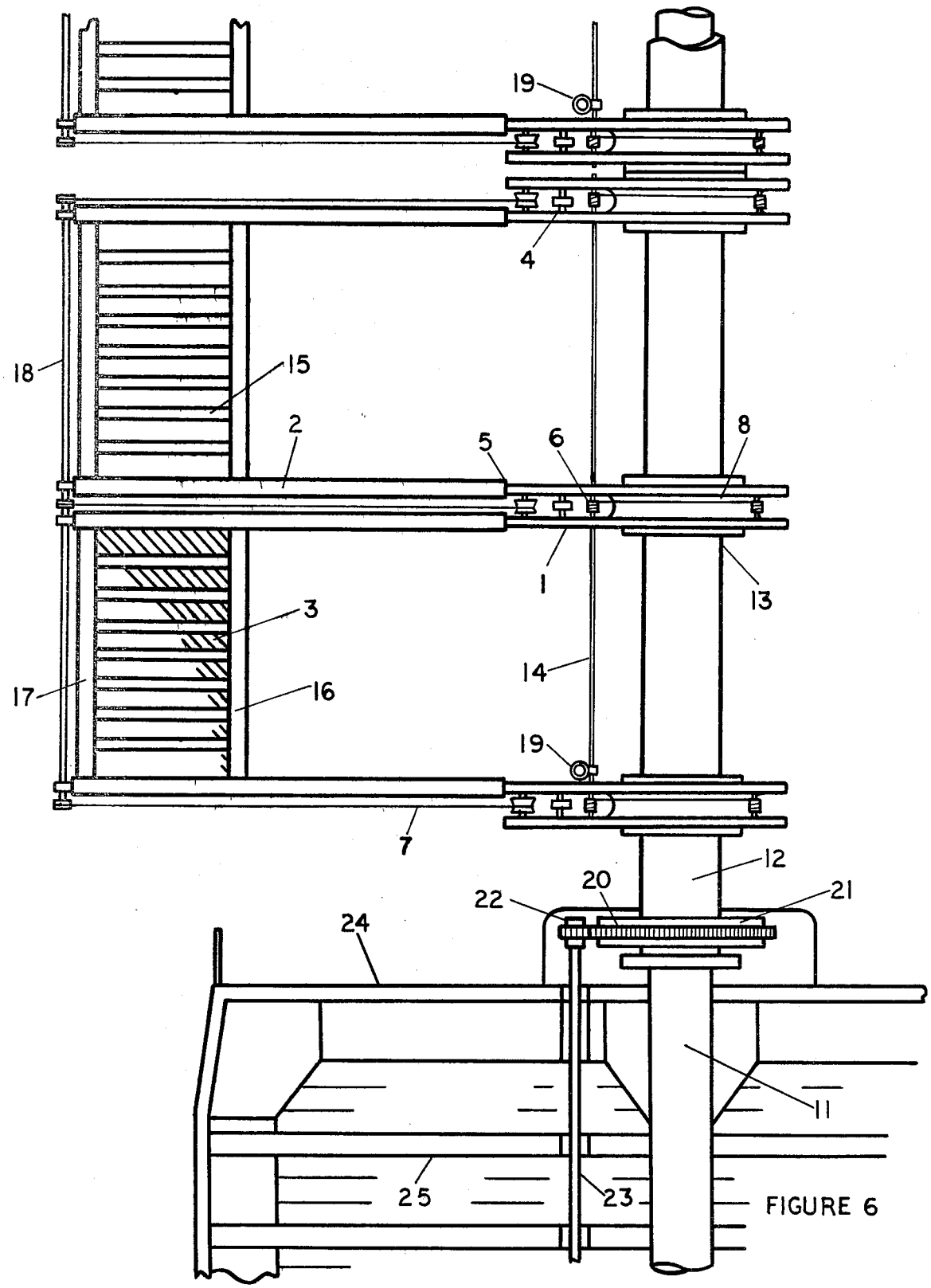
FIG. 6 illustrates the rotorsail turbine in elevation.

The low-speed, high-torque power produced by the rotorsail turbine must be converted to high-speed, low-torque power to be useful for electric generation. As is shown in FIG. 6, this can be accomplished aboard a rotorsail ship by a chain drive (20) between sprocket (21) on the torque tube (12) and sprocket (22) on the vertical drive-shaft (23). It is from the drive-shaft (23) that power would be extracted from the turbine for electric generation. The mast (11) would be fully braced by the deck (24) and bulkhead (25), and would require no standing rigging or other external support.

An added complication to wind propulsion is that the wind not only varies in speed and direction laterally: having different values at different locations, but also varies to a significant degree vertically; with the speed increasing rather rapidly with altitude above sea level. It is for this reason that the topmast sails of square-riggers and the upper area of fore-and-aft sails deliver a disproportionally large amount of the propulsive effort in relation to their area. Because the force of the wind increases with the square of its speed, for purely mechanical reasons it is desirable for the sail area to decrease with height so that the lateral wind load on the mast does not greatly increase with height, which could subject the mast to unacceptable bending loads. Consequently, on sailing ships the area of the uppermost sails is considerably less than that of the lower sails.

For this same reason, it would be preferable if rotorsail extension could vary with height, with the lesser extension at the top of the mast where the wind is strongest and the bending loads the greatest; and the greater sail extension at the base to extract the greatest possible amount of power from the slowest moving air. To permit such differential extension, the rotorsail turbine is divided into separate sectors, as shown in FIG. 6; each sector with its separate windlass drive-motor (19).

Figure 7:
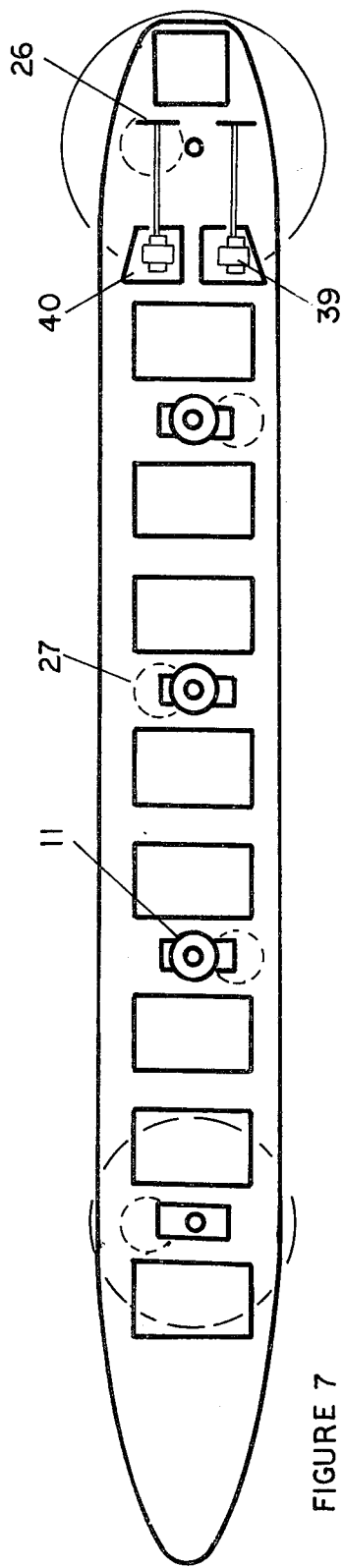
FIGS. 7 and 8 illustrate a possible configuration for a windpowered bulk-carrier.
Figure 8:
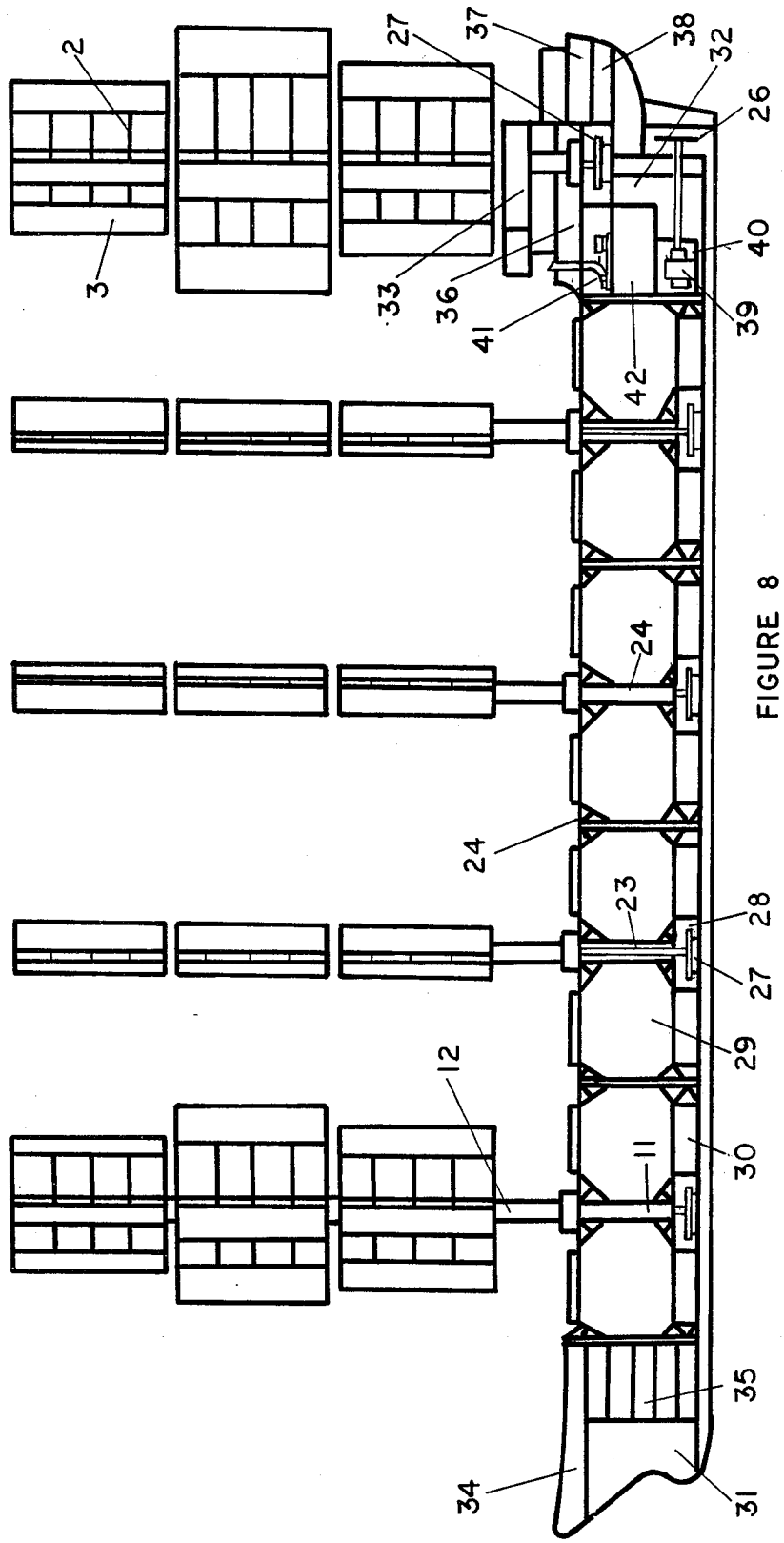

FIGS. 7 and 8 illustrate a possible configuration for a windpowered bulk-carrier with five rotorsail-turbines and driven by conventional screws (26). The three-sector turbines are shown in various states of extension. The turbines drive the generators (27) isolated below in separate compartments (28). The ship has the conventional single-deck, double-hull construction of bulk carriers. The holds (29) have conventional sloping sides to facilitate cargo removal; and because the masts (11) are self-supporting, there is no standing rigging to interfere with conventional cargo-handling equipment.

Lateral stability is maintained by ballast tanks (30) and longitudinal trim by the fore peak tank (31) and the aft peak tank (32). The helm, chart room, captain's quarters, and officer's accommodations are located in the aft deck house (33). The sail storage room (34) and general stores (35) are located forward.

Both the power monitoring and dispatch facilities (36) and the crew's accommodations (37) are located aft, the latter above the steering-gear room (38). The propulsion motors (39) are isolated in separate compartments (40) and directly drive the screws (26).

The electric power produced by the wind-turbine generators would be controlled by rotor extension to match the power demanded by the propulsion motors up to the maximum power available under the prevailing wind conditions. Because many ships are driven by electric-propulsion motors each turning a single screw, electric-drive is a well-proven system. Among the heaviest ships driven by electric propulsion were the quadruple-screw battleships whose propulsion systems were rated up to 40,000 horsepower per motor, and these were powered by steam-turbine electric-generators.

Modern advances in electric-power control will permit each wind-turbine generator to supply power to the propulsion system regardless of its power-output without danger of motoring. Whereas heavy water-cooled rheostats which dissipate large quantities of useful energy as waste-heat were required for power control on past electrically-propelled ships, modern circuitry can achieve the same control with little loss.

The performance of a rotorsail ship will resemble more closely that of an engine-propelled ship than that of a sailing ship, specifically because wind-direction will play only a secondary role in routing. Hence, commercial scheduling becomes a matter of averaging wind conditions over the route involved, assuming the shortest possible course. Modern wind-prediction techniques based on current weather conditions and historic weather data will greatly aid this process.

Electric propulsion is important to scheduling in this regard, for it will permit power to be drawn from each of the turbines in known amounts regardless of how fast each is revolving and the degree they are extended. Consequently, turbine power-production can be rated at all wind speeds and directions with an accuracy approaching power-production of an engine-propelled ship, permitting performance equations to be derived that are applicable under actual sailing conditions; virtually impossible with conventional sail.

With fifteen separate rotor sectors to be considered however, as in the case of the bulk carrier of FIG. 8, it is obvious that manual control of rotor extension would be impossible if optimum power production is to be realized. In contrast, it would be a simple matter for a computer to continuously monitor wind speed and direction and ship heading, as well as mast bending-moments and rotor windloads, so as to automatically maintain the rotor sectors at their optimum extension. This automatic control would permit as close a match as possible between the power generated by the turbines and the power demanded by the propulsion motors; all without exceeding the operating limits of the turbines, as might occur under storm conditions.

It is precisely under storm conditions that conventional sailing ships are most vulnerable to foundering, for exactly when the need for propulsion is greatest, the least power is available. Worse, whatever power is available cannot be used to drive the ship into the wind, the safest course in a storm, but instead the ship must run with the wind. In the vicinity of a lee shore, the result is most likely fatal to ship and crew alike. In constrast, because rotorsails can generate power while reefed, during a storm they can take advantage of the tremendous energy of the wind to drive the ship away from a lee shore.

Because the propulsive effort produced by sail is so dependent on wind direction, sailing ships have very poor maneuverability compared to motorships. In contrast, not only are the rotorsails omnidirectional, but screw propulsion permits rapid speed changes; and with twin screws, rapid emergency course changes by the application of differential power to the individual screws. Moreover, by the application of reverse thrust by reversing the propellers, rapid decelerations are possible. All of these maneuvers are particularly important when operating in congested areas such as ports and along narrow channels where close directional and speed control are required.

Because of the limitations on the maneuverability of commercial sail, all such ships would require auxiliary power units to supply propeller thrust in storm conditions and in port areas where sail propulsion would be unfeasible. However, the auxiliary power unit would be an essentially added-on feature that contributes nothing but propeller drag to the hull when not in operation. Moreover, on a course near to windward, the auxiliary power unit cannot augment sail power. Either the auxiliary power unit is used alone, or the ship must be sailed on a tacking course, in which case the engine is used to drive the ship a distance significantly longer than if the direct course were possible.

In addition, to adequately serve its primary purpose, the auxiliary power unit aboard commercial sail would have to be almost as powerful as the primary propulsion engines of a motorship of comparable displacement; particularly when called upon to save a sailing ship being driven towards a lee shore. In constrast, an auxiliary power unit in the form of an engine-driven electric-generator, as shown in FIG. 8 located in aft compartment (41) above the cross bunker (42), would be an integral part of the electric propulsion system of a rotorsail ship; and because its only function would be to drive the rotorsail ship when winds are inadequate, its power need be only a fraction of the rated power of the propulsion motors.

While there have been described what are at present considered to be the preferred embodiments of this wind turbine for marine propulsion, it will be obvious to those skilled in the art that various changes and modifications may be made therein without departing from the invention, and it is aimed therefore, in the appended claims to cover all such changes and modifications as fall within the true spirit and scope of the invention.

What is claimed is:

1. A wind turbine mechanically connected to electric generating means wherein the action of the wind upon said turbine causes rotation of said turbine about an essentially vertical mast thereby converting wind power to electric power for the propulsion motors of a screw-propelled ship comprised of a number of hubs rotatably mounted and equally spaced along the length of a vertical mast;

each of said hubs supporting radially disposed arms equally spaced about the circumference of said hubs;

said arms vertically alligned by torque tubes coaxial with said mast and situated between adjacent hubs and connected to them;

two horizontally disposed flexible yards vertically alligned with each other and sufficiently spaced apart to form a slot between them, said yards secured tangentially to the end of each of said arms;

all of each set of vertically alligned yards secured at their yardarms by a vertically disposed and circumferentially situated brace member;

each of said brace members secured by cables, said cables spaced in said slots and alligned by sheaves rotatably mounted upon each of said arms;

the free length of each of said cables controlled by a windlass rotatably mounted upon each of said arms;

and sail cloth secured to said yards, said sail cloth stretched between adjacent yards of said adjacent hubs.

2. A wind turbine according to claim 1, wherein said windlasses are powered by motor means and synchronized so as to maintain the free length of all said cables essentially equal;

said cables maintaining a curvature on said yards in the same circumferential direction, the amount of curvature dependent on the free length of said cables.

3. A wind turbine according to claim 2, wherein said sail cloth is stretched across the outside of flexible battens;

said battens fastened at intervals to rigid stays secured between said adjacent yards to maintain said sail cloth at essentially the same curvature as said yards.

4. A wind turbine according to claim 2, wherein said turbine is divided horizontally into separate sectors, each sector comprised of all the elements of said turbine;

said sectors each with a separate motor means effective to cause all of said yards of each sector to assume the same curvature independently of the curvature of said yards of the other sectors.

5. A wind turbine according to claim 1, wherein said torque tubes connecting said hubs transmit the power produced by said turbine thru a mechanical drive to an electric generator.

* * * * *